Nov. 12, 1963   H. W. MAYHEW ET AL   3,110,646
CENTRIFUGAL FILM EVAPORATING APPARATUS AND METHOD
Filed Aug. 4, 1959   3 Sheets-Sheet 1

Harry W. Mayhew
Hugh E. Templeton
*INVENTORS*

BY
Adams, Forward and McLean
ATTORNEYS

Nov. 12, 1963    H. W. MAYHEW ET AL    3,110,646
CENTRIFUGAL FILM EVAPORATING APPARATUS AND METHOD
Filed Aug. 4, 1959    3 Sheets-Sheet 2
FIG. 3
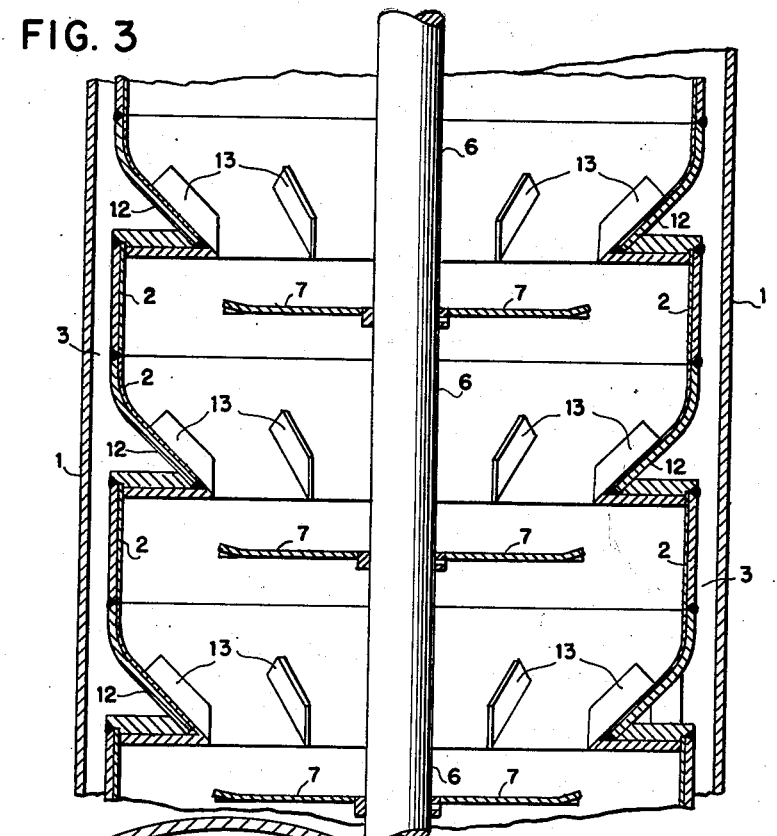
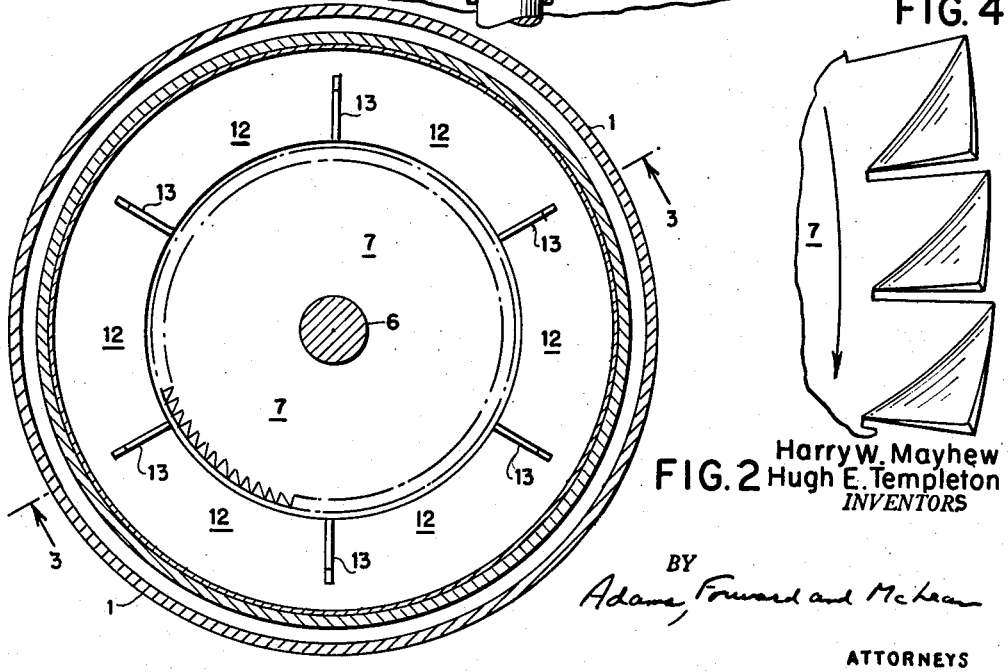
FIG. 4
FIG. 2
Harry W. Mayhew
Hugh E. Templeton
INVENTORS
BY
Adams, Forward and McLean
ATTORNEYS Nov. 12, 1963  H. W. MAYHEW ET AL  3,110,646
CENTRIFUGAL FILM EVAPORATING APPARATUS AND METHOD
Filed Aug. 4, 1959  3 Sheets-Sheet 3

Harry W. Mayhew
Hugh E. Templeton
*INVENTORS*

BY

ATTORNEYS

United States Patent Office 3,110,646
Patented Nov. 12, 1963

3,110,646
CENTRIFUGAL FILM EVAPORATING
APPARATUS AND METHOD
Harry W. Mayhew and Hugh E. Templeton, Cincinnati,
Ohio, assignors to Vulcan-Cincinnati, Inc., Cincinnati,
Ohio, a corporation of Ohio
Filed Aug. 4, 1959, Ser. No. 831,547
5 Claims. (Cl. 159—6)

This invention relates to an apparatus which is particularly adapted for use in the evaporation of heat-sensitive materials although it has use in other applications wherein a high rate of heat transfer to a liquid is desired. This invention also relates to an improved evaporation method wherein a high rate of heat transfer to a liquid and intimate contact between a vapor and a liquid are obtained.

There is a constant need in the art for new apparatus which provide for more efficient evaporation. For example, it is known to evaporate a urea melt in order to reduce its water content so that the melt can then be processed to form urea prills which are of low water content, mechanically strong, and of low tendency to absorb water. Such prills are a highly desirable fertilizer ingredient provided they are of low biuret content. Biuret is formed by the decomposition of urea, and this points to the need for dehydration of the urea melt under conditions such that the decomposition of urea to form biuret is minimized.

It has heretofore been proposed to conduct an evaporation operation in a generally cylindrical vertically positioned chamber in which the liquid to be subjected to evaporation is fed to a centrally located rotary device which throws the liquid against the internal, vertical wall of the chamber. Evaporation requires heat and hence the chamber has been provided with a heating jacket. Also, means for subjecting the chamber to vacuum have been associated with the chamber, since it is well known that decomposition is reduced by evaporation at low pressures and hence low temperatures.

In evaporation, the extent of evaporation accomplished in a single stage will not exceed the extent of evaporation which would be accomplished under equilibrium conditions. Hence, where the extent of evaporation to be accomplished is large, as in evaporating a urea-water mixture containing 25% by weight of water to a urea-water mixture containing only 0.5% by weight of water, evaporation in stages is indicated. This means that the chamber must be provided with a plurality of rotary devices and thus means must be provided for transferring the liquid undergoing evaporation from one stage to the next stage.

In the distillation art, it is old to distill in apparatus which is essentially a generally cylindrical, vertically positioned vessel provided with a centrally positioned, rotary, vertical shaft having attached thereto a plurality of plates, cones or the like which serve to throw liquid undergoing distillation against the inner, vertical wall of the vessel. Cones are attached to the inside of the vessel and each serves to collect liquid thrown against the wall and feed the liquid to the next lower rotary plate, cone or the like.

Design conditions in the evaporation of heat-sensitive materials and in distillation are not strictly analogous. Thus, in evaporation, heat is generally supplied to the material undergoing evaporation by means of an external heating jacket, whereas in distillation such heat as is necessary is generally supplied from a reboiler located at the base of the distillation column. In evaporating heat-sensitive materials, a high rate of heat-transfer must be provided from the external heating jacket to the liquid in order to minimize the adverse effect of prolonged subjection of the liquid to elevated temperature.

One might suppose that an efficient evaporator would be obtained simply by joining an external heating jacket to the type of distillation apparatus described above, a high rate of heat transfer from the jacket to the liquid being subjected to evaporation being produced by the turbulence resulting from the impact and circumferential motion of the liquid as it is thrown against the inner wall of the vessel. However, an evaporator is not of good design merely because it provides for a high rate of heat transfer. Thus, in addition, the liquid undergoing evaporation must remain in the evaporator a minimum amount of time, or otherwise undue decomposition of the liquid will take place. And where spinning devices are employed to throw liquid against the inner wall of the vessel, this method of operation, although aiding heat transfer, is inconsistent with minimum residence time. The reason for this is that the liquid thrown out by the rotary plates, cones or the like has a circumferential component of motion. As a result, the liquid draining from the inner wall of the vessel, after having been impacted thereon, has a whirling motion, so that the liquid does not drain quickly to the rotary plate, cone or the like below. This means that the liquid undergoing evaporation does not drain as promptly as it might to the rotary plate or the like below, and hence the residence time of the liquid in the vessel is not as short as it might be.

In accordance with this invention, a heat exchanger design is provided whereby the deficiency just mentioned can be avoided. Thus, in accordance with this invention, baffling means are associated with the means whereby liquid, after having been thrown against the heat-exchange surface by the rotary plate, cone or the like, is drained to the next lower rotary plate, cone or the like. The baffling means are of such design as to substantially reduce the rotary motion of the liquid, so that the liquid will drain promptly to the rotary plate, cone or the like positioned below. By providing the baffling means, efficient heat transfer and short residence time of the liquid undergoing evaporation are accomplished at the same time. Also, improved liquid mixing is obtained on each rotary device. Hence, in its one aspect, this invention is an apparatus which is suitable for use as an evaporator and which is of generally cylindrical construction. The vessel is provided with an external heat exchanger and also with a centrally located, vertically positioned rotary shift to which there is attached a plurality of rotary devices positioned one above the other adapted to project or throw liquid undergoing evaporation against the inner, vertical wall of the vessel. The vessel is also provided with means for collecting the liquid projected or thrown from each rotary device and feeding it to the rotary device directly below it. Associated with such collecting means are baffling means which arrest the rotary flow of the liquid imparted to it by the rotary devices after the liquid has been in heat-exchange relationship with the external heat exchanger, so that the liquid will flow more promptly to the rotary device directly below the collecting means.

The rotary devices attached to the rotary shaft are preferably in the form of flat plates having edges which are serrated in such manner that different points on the edges are positioned at different points longitudinally with respect to the shaft. By constructing the rotary devices in such manner, the liquid is projected from the rotary devices more in the form of a spray and this makes for improved contact between the liquid thrown from the rotary devices and the vapor evaporated.

For a more complete understanding of this invention, reference is made to the accompanying drawings which illustrate an embodiment thereof and in which:

FIGURE 2 is a plan section taken along line 2—2 of FIGURE 1;

FIGURE 3 is a fragmentary vertical cross-section showing the rotating shaft, plates attached thereto, collecting means in the form of cones and baffles associated therewith, the section being taken along the line 3—3 of FIGURE 2;

FIGURE 4 is a fragmentary plan view of a plate;

Figure 1:
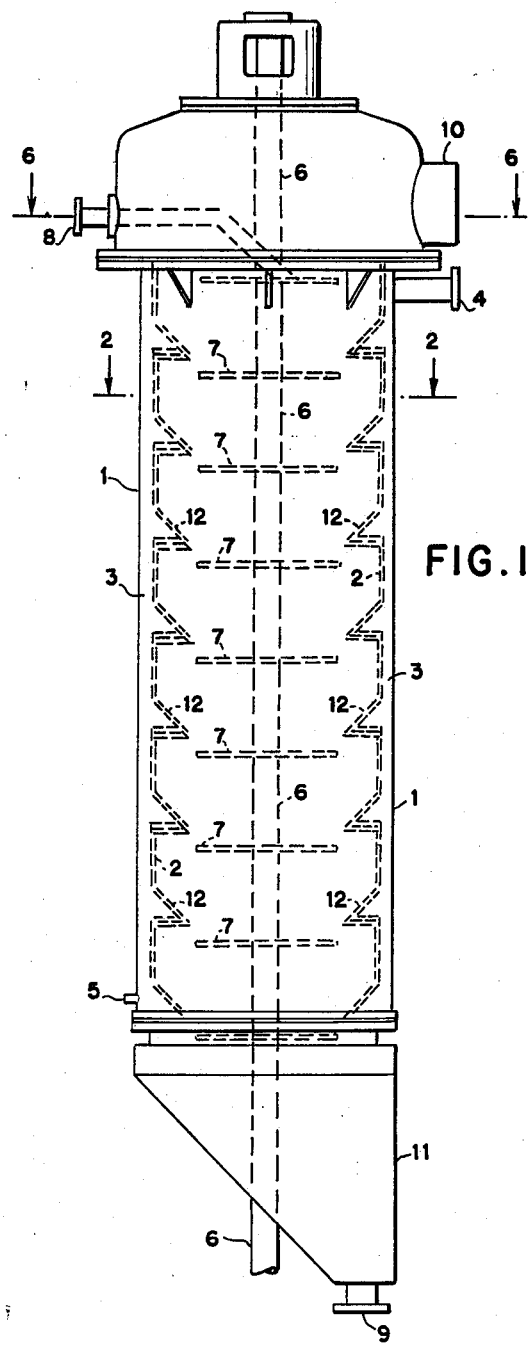
FIGURE 1 is an elevation showing the general arrangement of the apparatus.

Referring particularly to FIGURE 1, the apparatus shown is one which is adapted for use in the evaporation of a conventional urea melt containing approximately 25% by weight of water to provide a substantially dehydrated urea containing approximately 0.5 percent by weight of water. As shown, the apparatus is a generally cylindrical, vertically positioned vessel 1, having an outer wall and an inner wall 2, the space 3 between the outer wall and the inner wall 2 being an external heat-exchange jacket in which steam can be injected through line 4 and from which condensate can be removed through line 5. The apparatus is also provided with rotating shaft 6, driven from the bottom by a motor (not shown), a plurality of plates 7 being rigidly attached to the shaft 6. Urea undergoing evaporation is fed in liquid form to the apparatus through line 8 and is removed by means of line 9 in liquid form. Outlet 10 is provided for the removal of water vapor from the apparatus and is connected to a source of vacuum (not shown). The numeral 11 designates a chamber at the base of the apparatus for the drainage of liquid, dehydrated urea therefrom. Liquid urea thrown against the inner wall 2 is collected by cones 12 and transferred to the plate below a given cone.

Considering now FIGURE 2 and FIGURE 3, each collecting cone 12 is provided with a plurality of baffles 13. Hence, in the operation of the apparatus, liquid is thrown from plate 7 against wall 2. The impact and whirling motion of the liquid makes for excellent heat-transfer between the liquid and the heat exchanger 3. After impacting against wall 2, the liquid descends into the cone section 12. The whirling motion of the liquid tends to prevent the descent of the liquid in the cone and, in accordance with this invention, this difficulty is obviated by providing baffles 13. These baffles arrest the whirling motion of the liquid urea, so that it can flow promptly down the cones to the plate below. In this manner, the residence time of the liquid in the apparatus is reduced and hence decomposition of the urea is minimized.

Figure 5:
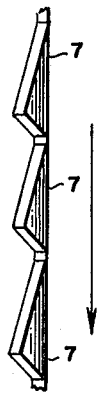
FIGURE 5 is a developed elevation showing the edge of a plate.

FIGURE 4 and FIGURE 5 illustrate a particularly advantageous construction for the rotary plates 7. Thus, as shown, particularly in FIGURE 5, the edge of the plate is serrated so that various points on the edge of the plate are at different heights. The effect of forming the plate in this manner is that the liquid leaves the plate in the form of a band of droplets, the band having a definite depth in the longitudinal direction of the shaft 6. Hence, more intimate contact between liquid descending the apparatus and vapor ascending the apparatus is provided for, this being important where the apparatus is to be used as a mass-transfer as well as a heat-transfer device.

Figure 6:
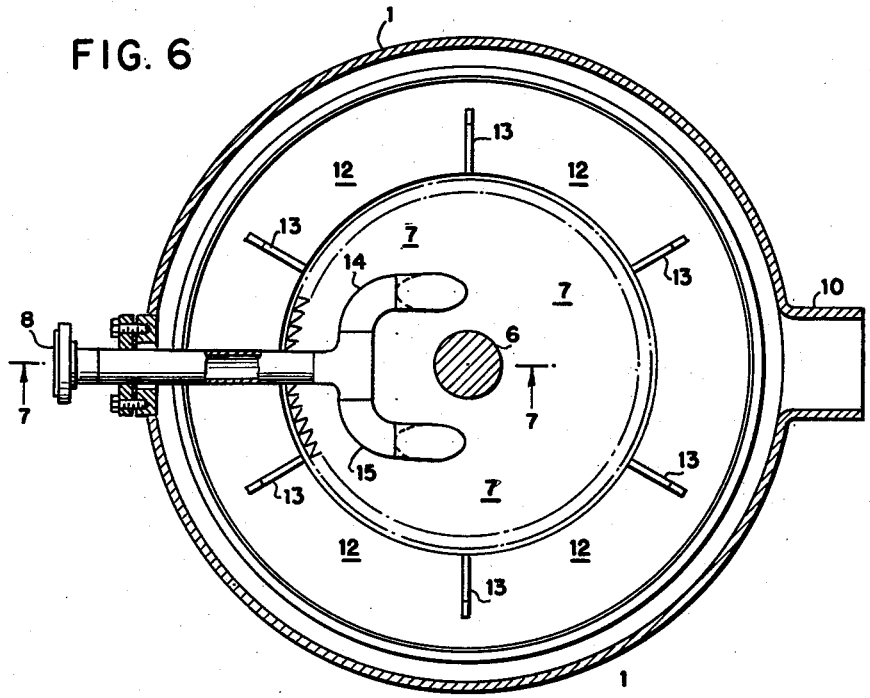
FIGURE 6 is a section taken substantially along line 6—6 of FIGURE 1.
Figure 7:
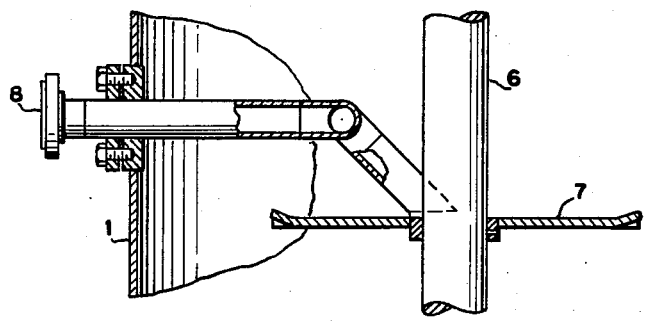
FIGURE 7 is a broken-away cross-section taken along line 7—7 of FIGURE 6.

Finally, FIGURE 6 and FIGURE 7 give further details as to the method whereby the liquid undergoing treatment is introduced into the apparatus. Thus, line 8 is split into lines 14 and 15 in order that the flow of liquid to the top plate will be distributed more uniformly.

A typical apparatus of the type shown in the drawings has nine plates which are spaced approximately fifteen inches apart on the rotating shaft and which have a diameter of approximately twenty-three inches. The shaft is rotated at approximately 400 r.p.m. Such an apparatus can suitably be used in the evaporation of approximately 240 tons of urea per day. The pressure in the apparatus is maintained at approximately 14.7 p.s.i.a. and steam at a temperature of 366° F. is supplied to the heat-exchanger through line 4.

Various modifications can be made in the apparatus which is shown in the drawings in order to provide further embodiments which fall within the scope of the present invention. For example, the plates need not be serrated as shown, but instead can be perfectly flat, if desired, or cones can be used in place of plates. Also, a plurality of plates or other distributing means can be attached to the shaft between each cone or other collecting device. Moreover, a flat plate provided with suitable baffles can be used in place of the cones shown in the drawings for the purpose of transferring the liquid from the heat-exchanger wall to the rotating plate or the like. The diameter of the rotating plates or the like is preferably slightly smaller than the holes through the cones, since when the apparatus is constructed in this manner it is more easily assembled. The shaft can be driven either from the top or from the bottom, it can be provided with external or internal bearings and it can have a fixed or variable speed. Depending upon the use to which the apparatus is to be put, means can be provided for the introduction into the bottom of the apparatus of a sweep gas, such as flue gas or nitrogen. The apparatus can be designed to operate under vacuum, at atmospheric pressure or at super atmospheric pressure. The apparatus can also be designed to use conventional heating means other than steam, for example, aryl silicates or Dowtherm. On the other hand, a fluid coolant rather than a heating fluid can be supplied to the heat-exchange jacket, among the fluid coolants being cooling water, refrigerated water or brine, or evaporating Freons.

The apparatus of the present invention can be used for a variety of purposes other than the evaporation of urea melts. For example, the apparatus is useful in the evaporation of solvents from high-boiling materials and plasticizers which are heat-sensitive. Also, the apparatus can be used in the processing of other heat-sensitive materials such as tall oil, fatty acids and resin acids. In addition, the apparatus finds application in the depitching of crude tall oil, that is, an operation wherein the bulk of the tall oil including the fatty acids and resin acids present therein are removed overhead and the pitch present in the crude tall oil is removed from the bottom or base of the apparatus. In this depitching operation, low retention time avoiding thermal degradation is important. Additionally, the apparatus can be used in the evaporation of ammonium nitrate of low water content in order to remove further amounts of water. Here again, low residence time is desirable. Finally, the apparatus can be used in removing water or other relatively low boiling materials from nylon salt, styrene monomer, and the like.

What is claimed is:

1. Apparatus suitable for use in evaporations involving heat sensitive liquids comprising a central shaft, means for rotating the shaft, a plurality of rotors fastened to the shaft one above the other, each of said rotors being in the form of a substantially flat plate substantially perpendicular to the axis of the shaft and having a serrated outer edge thereby defining a plurality of portions along said outer edge, each of said portions being disposed angularly with respect to the plane of the rotor, means for feeding liquid to the top rotor, collecting means for collecting liquid projected from a rotor and feeding it to the rotory directly below it, said collecting means comprising the interior wall of an external indirect heat exchanger, and baffling means associated with the collecting means adapted to arrest the rotary component of motion of the liquid after it has been projected from the rotor.

2. Apparatus according to claim 1 in which said collecting means are collecting cones.

3. Apparatus according to claim 2 in which the diameter of said rotors is less than the smallest diameter of said collecting cones.

4. Apparatus according to claim 3 in which said collecting cones comprise the interior wall of an external heat exchanger.

5. A method of evaporating a liquid which comprises repeatedly centrifugally projecting the liquid from a coaxial source of supply in successively lower planes against successively lower levels of a closed surface generally transverse to the planes of projection, supplying heat by indirect heat-exchange to the liquid while it is in contact with the closed surface, collecting the liquid and arresting the rotary motion thereof after it has been projected against the closed surface, and feeding the liquid to the next lower level of centrifugal projection of the liquid.

References Cited in the file of this patent

UNITED STATES PATENTS

| | | |
|---|---|---|
| 1,692,617 | Bowen | Nov. 20, 1928 |
| 1,732,805 | Yarmett | Oct. 22, 1929 |
| 1,844,643 | Yarmett | Feb. 9, 1932 |
| 1,856,120 | Valentine | May 3, 1932 |
| 2,030,734 | Baird | Feb. 11, 1936 |
| 2,396,526 | Nilsson | Mar. 12, 1946 |
| 2,593,401 | Adams | Apr. 22, 1952 |
| 2,779,724 | Dunning et al. | Jan. 29, 1957 |
| 2,804,379 | Wistrich et al. | Aug. 27, 1957 |
| 2,840,460 | Masek et al. | June 24, 1958 |
| 2,912,310 | Walley et al. | Nov. 10, 1959 |

FOREIGN PATENTS

| | | |
|---|---|---|
| 72,532 | Germany | Feb. 23, 1893 |
| 648,995 | Great Britain | Jan. 17, 1951 |
| 469,975 | Italy | Mar. 17, 1952 |